United States Patent
Shi et al.

(10) Patent No.: US 11,919,377 B2
(45) Date of Patent: Mar. 5, 2024

(54) OVERTURNING AND TENSIONING MECHANISM FOR CONVERTIBLE SOFT TOP OF VEHICLE

(71) Applicant: CHANGZHOU SUNWOOD INTERNATIONAL TRADING CO., LTD., Changzhou (CN)

(72) Inventors: Hang Shi, Changzhou (CN); Hongjuan Zheng, Changzhou (CN)

(73) Assignee: CHANGZHOU SUNWOOD INTERNATIONAL TRADING CO., LTD., Changzhou (CN)

( * ) Notice: Subject to any disclaimer, the term of this patent is extended or adjusted under 35 U.S.C. 154(b) by 47 days.

(21) Appl. No.: 17/838,310

(22) Filed: Jun. 13, 2022

(65) Prior Publication Data
US 2023/0234431 A1    Jul. 27, 2023

(30) Foreign Application Priority Data

Jan. 25, 2022 (CN) .......................... 202220226489.4

(51) Int. Cl.
*B60J 7/08* (2006.01)
*B60J 7/12* (2006.01)

(52) U.S. Cl.
CPC ............. *B60J 7/085* (2013.01); *B60J 7/1226* (2013.01)

(58) Field of Classification Search
CPC ..... B60J 7/085; B60J 7/065; B60J 7/12; B60J 7/1226; B60J 7/1291; B60J 7/11; B60J 7/064; B60R 5/047; B60P 7/04

USPC ...... 296/98, 107.01, 107.12, 107.15, 107.16, 296/216.01, 219, 218, 107.06, 107.19, 296/216.02, 224, 121
See application file for complete search history.

(56) References Cited

U.S. PATENT DOCUMENTS

| | | | | |
|---|---|---|---|---|
| 1,883,739 A | * | 10/1932 | Ford ........................ | B60J 7/085 296/219 |
| 4,830,425 A | * | 5/1989 | Muscat .................. | B60J 7/1851 296/121 |
| 4,898,420 A | * | 2/1990 | Takada ................... | B60J 7/1291 296/219 |
| 5,992,917 A | * | 11/1999 | Hilliard ..................... | B60J 7/10 296/121 |
| 6,158,786 A | * | 12/2000 | Droste ................... | B60J 7/1851 292/201 |

(Continued)

*Primary Examiner* — Amy R Weisberg
*Assistant Examiner* — Veronica M Shull
(74) *Attorney, Agent, or Firm* — Bayramoglu Law Offices LLC

(57) ABSTRACT

An overturning and tensioning mechanism includes a vehicle body, a soft top, a fixed connecting plate, and a movable connecting plate. An upper end of the vehicle body is provided with an opening, a connecting piece is fixed or integrally formed on the vehicle body, and the connecting piece is provided with an accommodating groove. The soft top is configured to cover the opening. The fixed connecting plate is fixedly connected with the soft top, and the fixed connecting plate is fixed on the vehicle body. The movable connecting plate is fixedly connected with the soft top. The movable connecting plate is provided with a support member. A head of the support member is provided with a matching portion matched with the accommodating groove of the connecting piece. An opening of the accommodating groove faces away from the fixed connecting plate.

7 Claims, 3 Drawing Sheets

(56) References Cited

U.S. PATENT DOCUMENTS

| | | | |
|---|---|---|---|
| 7,762,612 B2 * | 7/2010 | Brockhoff | B60J 7/1851 |
| | | | 296/121 |
| 7,900,991 B2 * | 3/2011 | Fallis, III | B60J 7/1291 |
| | | | 296/107.13 |
| 9,815,356 B2 * | 11/2017 | Haberkamp | B60J 10/15 |
| 2004/0130188 A1 * | 7/2004 | Stevens | B60J 7/10 |
| | | | 296/218 |

* cited by examiner

OVERTURNING AND TENSIONING MECHANISM FOR CONVERTIBLE SOFT TOP OF VEHICLE

CROSS REFERENCE TO THE RELATED APPLICATIONS

This application is based upon and claims priority to Chinese Patent Application No. 202220226489.4, filed on Jan. 25, 2022, the entire contents of which are incorporated herein by reference.

TECHNICAL FIELD

The present invention relates to the technical field of auto parts, and in particular, to an overturning and tensioning mechanism for a convertible soft top of a vehicle.

BACKGROUND

As a model with off-road performance, the sport utility vehicle (SUV) generally has a convertible roof above the cab, and a semi-open soft top is arranged at the convertible roof. In the prior art, the semi-open soft top cannot be rolled up, a bracket (the bracket is relatively long) is rotatably connected with the vehicle body, and the soft top can only be overturned and folded backward along with the connecting bracket, which has a complex structure and occupies a large space.

SUMMARY

In order to solve the problem that an overturning structure of a soft top occupies a large space in the prior art, the present invention provides an overturning and tensioning mechanism for a convertible soft top of a vehicle which occupies a small space.

The following technical solutions are used to solve the technical problems in the present invention.

An overturning and tensioning mechanism for a convertible soft top of a vehicle includes:
  a vehicle body, where an upper end of the vehicle body is provided with an opening,
  a soft top, where the soft top is configured to cover the opening;
  a fixed connecting plate, where the fixed connecting plate is fixedly connected with the soft top, and the fixed connecting plate is fixed on the vehicle body;
  a connecting piece, where the connecting piece is fixed or integrally formed on the vehicle body, and the connecting piece is provided with an accommodating groove; and
  a movable connecting plate, where the movable connecting plate is fixedly connected with the soft top, the movable connecting plate is provided with a matching portion matched with the accommodating groove of the connecting piece, an opening of the accommodating groove faces away from the fixed connecting plate, and the matching portion is capable of abutting against the accommodating groove and rotating relative to the accommodating groove.

Further, a support member is provided at two sides of the movable connecting plate, and the matching portion is provided on the support member.

Further, the movable connecting plate and the fixed connecting plate may be respectively arranged on opposite sides of the soft top.

Further, the accommodating groove may include an arc-shaped groove. A support surface being tangent to the arc-shaped groove and configured to support the matching portion may extend from one end of the arc-shaped groove. The matching portion may be provided with an arc surface matched with the arc-shaped groove and an end surface matched with the support surface.

Further, one end of the arc-shaped groove away from the support surface may extend outward freely, and the opening for guiding the matching portion may be formed between an extended end of the arc-shaped groove and the support surface.

Further, the arc-shaped groove may be a semicircular groove.

Further, the connecting piece may be further provided with a limiting structure configured to limit displacement of the movable connecting plate in a central direction of the arc-shaped groove.

Further, the limiting structure may include a baffle arranged on the connecting piece.

The present invention has the following beneficial effects:
  (1) The movable connecting plate of the overturning and tensioning mechanism for a convertible soft top of a vehicle of the present invention can be overturned and rolled up backward together with the soft top, which occupies a small space.
  (2) The arc surface of the matching portion of the movable connecting plate abuts against the accommodating groove of the connecting piece. The end surface of the matching portion is matched with the support surface of the connecting piece. The baffle on the connecting piece limits the left and right movement of the movable connecting plate. Then a locking device for the vehicle fixes the movable connecting plate, such that the movable connecting plate is fixed firmly and will not shake easily.
  (3) On the one hand, the baffle on the connecting piece can limit the position of the movable connecting plate, and on the other hand, the baffle can play the role of facilitating guiding the arc surface of the matching portion of the support member into the arc-shaped groove.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and those of ordinary skill in the art may still derive other drawings from these accompanying drawings without creative efforts.

Figure 1:
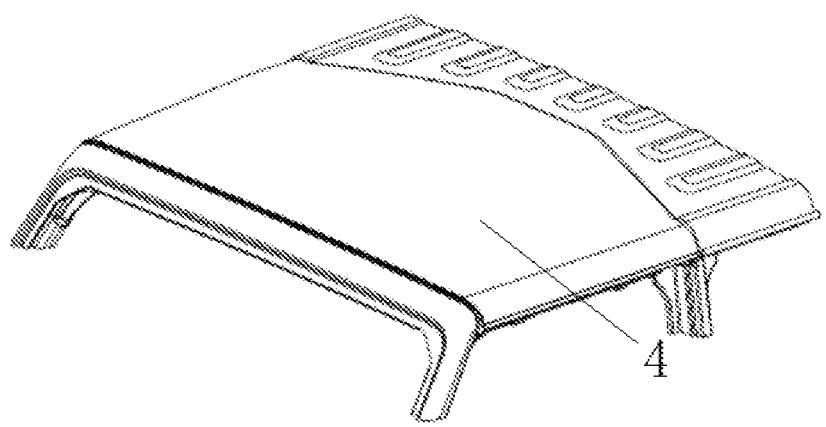
FIG. 1 is a cover state diagram of a convertible soft top of a SUV of the present invention.

Reference numerals: 1, vehicle body, 2, opening, 3, connecting piece, 31, accommodating groove, 311, arc-shaped groove, 312, support surface, 32, opening, 33, baffle, 4, soft top, 5, fixed connecting plate, 6, movable connecting plate, 61, support member, 611, arc surface, and 612, end surface.

DETAILED DESCRIPTION OF THE EMBODIMENTS

The technical solutions in embodiments of the present invention will be described below clearly and completely with reference to the accompanying drawings in the embodiments of the present invention. Apparently, the described embodiments are merely a part, rather than all of the embodiments of the present invention. The following description of at least one exemplary embodiment is merely illustrative, and not intended to limit the present invention and application or use thereof in any way. All other embodiments obtained by those of ordinary skill in the art based on the embodiments of the present invention without creative efforts shall fall within the protection scope of the present invention.

It should be noted that the terms used herein are merely used for describing specific implementations, but are not intended to limit the exemplary implementations of the present invention. As used herein, the singular forms are intended to include the plural forms as well, unless the context clearly indicates otherwise, and also, it should be understood that when the terms "include" and/or "comprise" are used in this specification, they indicate that there are features, steps, operations, devices, elements, and/or combinations thereof.

The relative arrangement of the components and steps, the numerical expressions and numerical values set forth in these embodiments do not limit the scope of the present invention unless specifically stated otherwise. Meanwhile, it should be understood that for the convenience of description, the dimensions of various parts shown in the accompanying drawings are not drawn in an actual proportional relationship. The technologies, methods, and equipment known to those skilled in the art may not be discussed in detail, but where appropriate, the technologies, methods, and equipment should be regarded as part of the authorized specification. In all examples shown and discussed herein, any specific value should be interpreted as merely exemplary, rather than restrictive. Therefore, other examples of the exemplary embodiments may have different values. It should be noted that similar reference signs and letters represent similar items in the accompanying drawings below. Therefore, once an item is defined in one drawing, it does not need to be further discussed in subsequent drawings.

It should be understood that in the description of the present invention, orientation terms such as "front", "rear", "upper", "lower", "left", "right", "transverse", "longitudinal", "vertical", "horizontal", "top" and "bottom" indicate orientation or position relationships based on the accompanying drawings. Unless otherwise specified, these orientation terms are merely intended to facilitate or simplify the description of the present invention, rather than to indicate or imply that the mentioned device or elements must have a specific orientation and must be constructed and operated in a specific orientation. Therefore, they should not be construed as a limitation to the protection scope of the present invention. The orientation terms "inner" and "outer" refer to the inner and outer parts relative to the contour of the mentioned component.

For ease of description, spatially relative terms, such as "on the upper side of", "above", "on the upper surface of" and "on", can be used herein to describe the spatial positional relationship between devices or features shown in the figure. It should be understood that the spatially relative terms are intended to encompass different orientations of the devices in use or operation in addition to those shown in the figure. For example, if a device in the figure is inverted, it is described as a device "above other devices or structures" or "on the upper side of other devices or structures". Therefore, the device will be positioned as "below other devices or structures" or "on the lower side of other devices or structures". Therefore, the exemplary term "above" may include both orientations "above" and "below". The device may also be positioned in other different ways (rotated by 90 degrees or in other orientations), but the spatially relative description should be explained accordingly.

In addition, it should be noted that the use of words such as "first" and "second" to define parts and components is only for the convenience of distinguishing corresponding parts and components. Unless otherwise stated, the above words have no special meaning, so they should not be construed as a limitation on the protection scope of the present invention.

Figure 2:
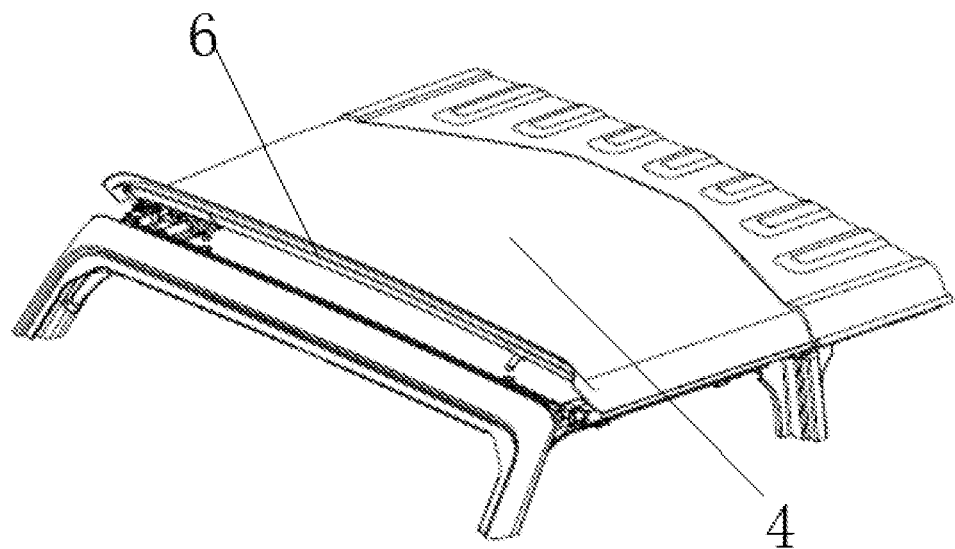
FIG. 2 is a state diagram after a movable connecting plate is overturned.
Figure 3:
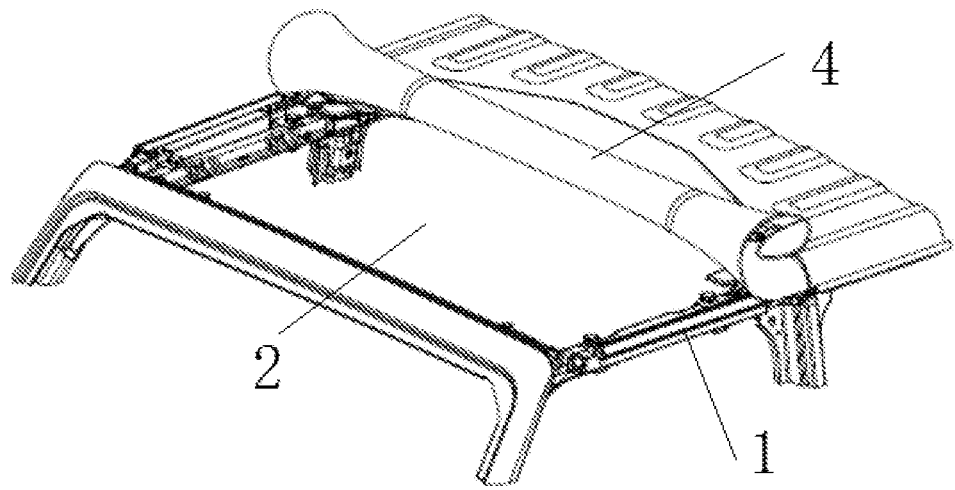
FIG. 3 is a state diagram after the movable connecting plate and a soft top are rolled up.
Figure 4:
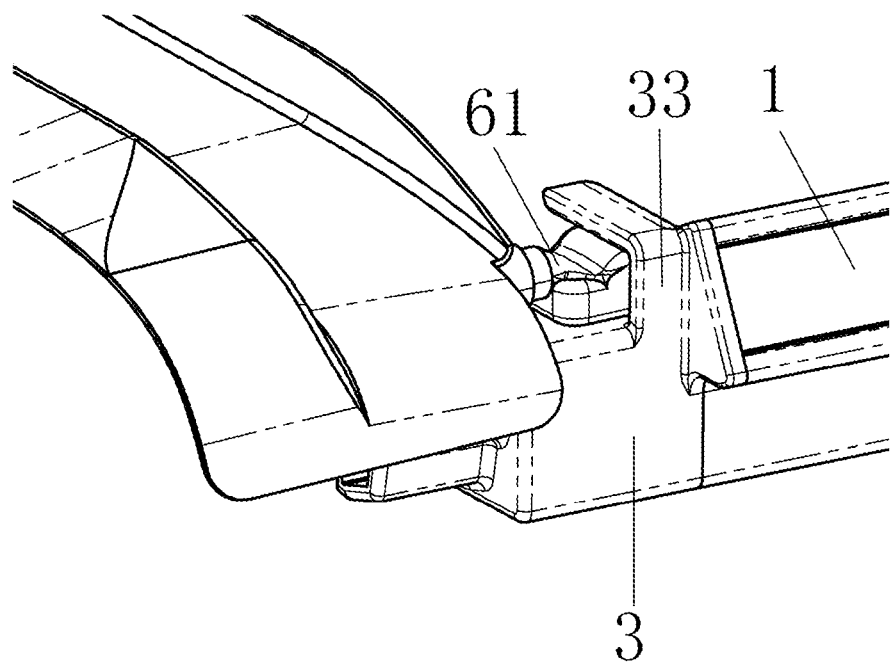
FIG. 4 is a diagram of a matching relationship between a support member and a connecting piece.
Figure 5:
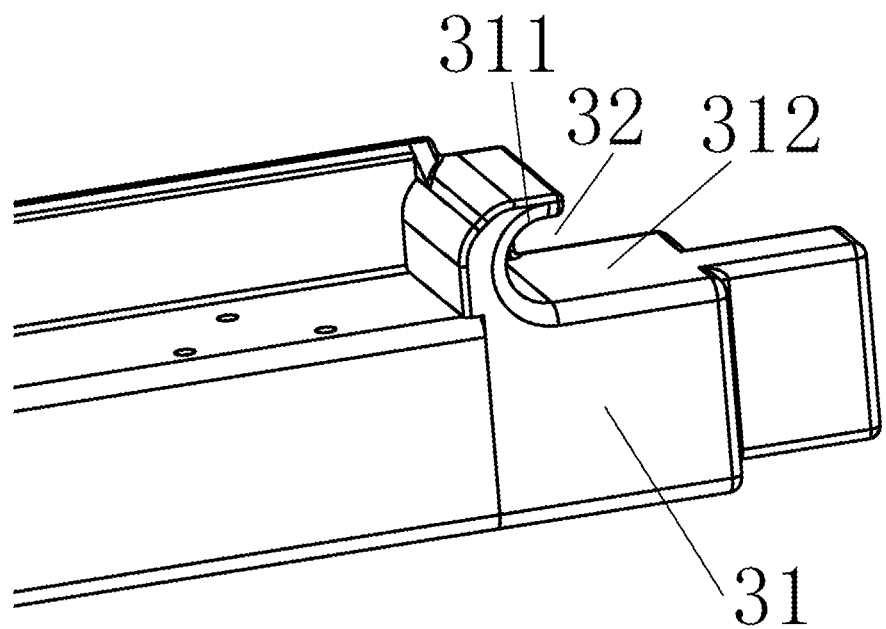
FIG. 5 is a structural diagram of the connecting piece.
Figure 6:
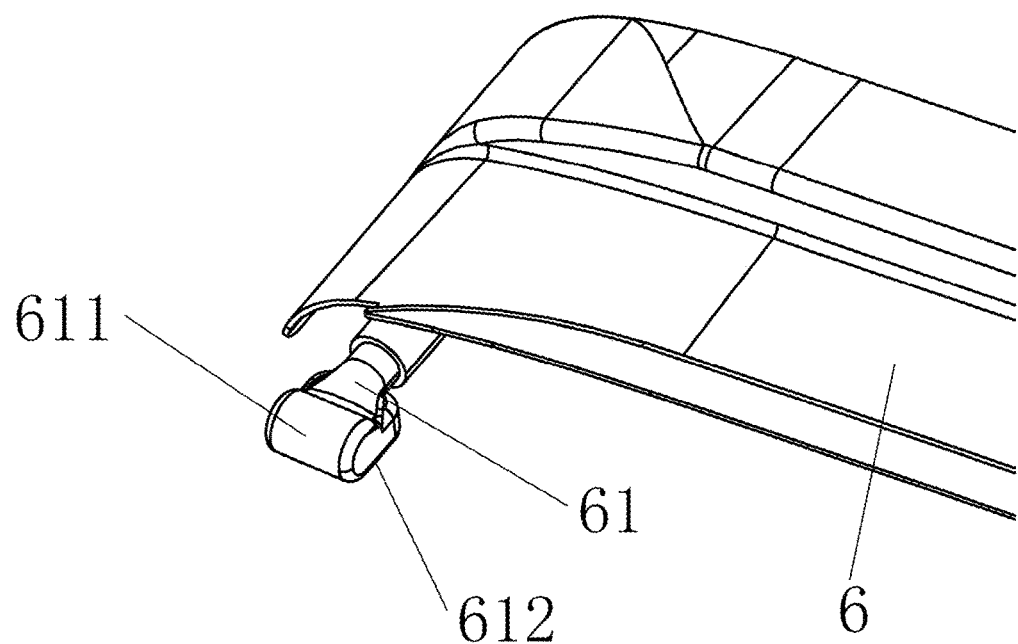
FIG. 6 is a structural diagram of the movable connecting plate.
Figure 7:
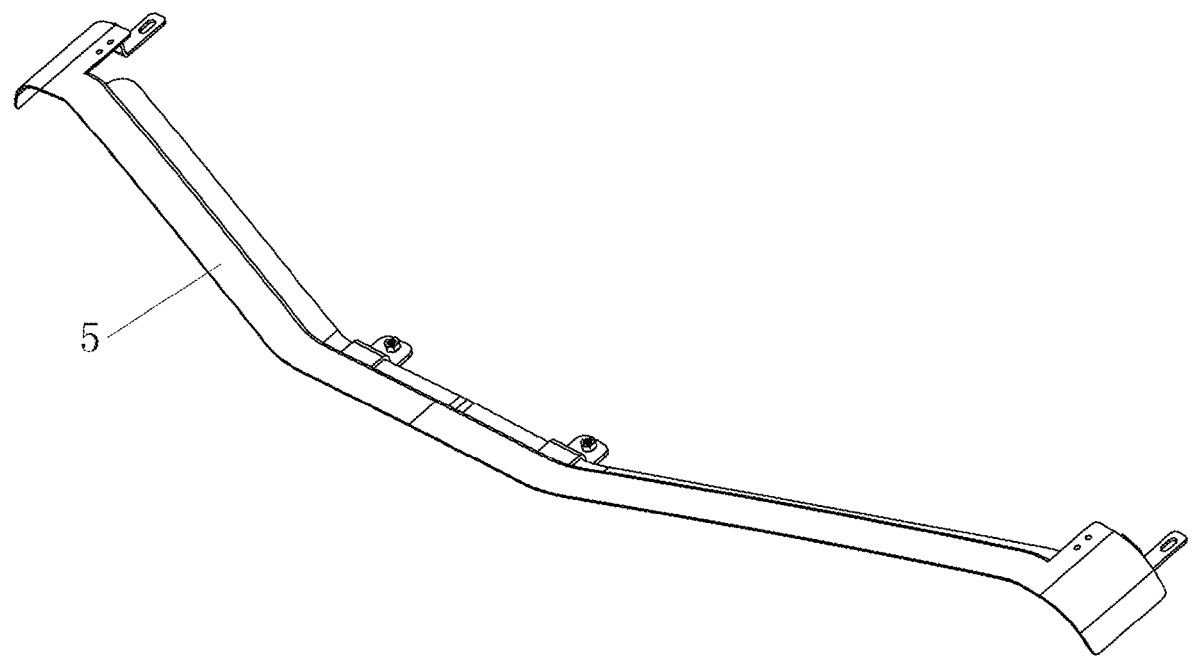
FIG. 7 is a structural diagram of a fixed connecting plate.

An overturning and tensioning mechanism for a convertible soft top of a vehicle of the present invention is mainly used in SUV, and can also be used in other models. As shown in FIG. 1 to FIG. 7, an upper end of a vehicle body 1 of the vehicle is provided with an opening 2. The opening 2 is provided with a soft top 4 configured to cover or open the opening (2). One end of the soft top 4 is connected with the fixed connecting plate 5, and the fixed connecting plate 5 is fixed on the vehicle body 1. The other end of the soft top 4 is connected with the movable connecting plate 6. The movable connecting plate 6 and the fixed connecting plate 5 are respectively arranged on opposite sides of the soft top 4. A locking device for locking the movable connecting plate 6 and the vehicle body 1 is also arranged between the movable connecting plate 6 and the vehicle body. For the locking device, reference may be made to a mechanism for locking vehicle panels in the prior art, and it only needs to realize locking and unlocking.

Due to space limitations, the movable connecting plate cannot be inserted into the accommodating groove in parallel, so when it is installed, the initial position of the movable connecting plate is inclined. Based on the above motion principle, a connecting piece 3 is fixed or integrally formed on the vehicle body 1. The connecting piece 3 is provided with an accommodating groove 31. The movable connecting plate 6 is provided with a support member 61. A head of the support member 61 is provided with a matching portion matched with the accommodating groove 31 of the connecting piece 3. An opening 32 of the accommodating groove 31 faces away from the fixed connecting plate 5. The matching portion abuts against the accommodating groove 31 and rotates relative to the accommodating groove 31.

As an embodiment of the present invention, the accommodating groove 31 includes an arc-shaped groove 311. A support surface 312 being tangent to the arc-shaped groove and configured to support the matching portion extends from one end of the arc-shaped groove 311. The matching portion is provided with an arc surface 611 matched with the arc-shaped groove 311 and an end surface 612 matched with the support surface 312.

One end of the arc-shaped groove 311 away from the support surface 312 extends outward freely, and the opening 32 for guiding the matching portion is formed between an extended end of the arc-shaped groove 311 and the support surface 312.

The arc-shaped groove 311 is a semicircular groove. The arc-shaped groove 311 can be smaller than a ½ circular groove, but the stability is not as good as the semicircular groove.

In order to prevent left and right movement of the movable connecting plate 6, the connecting piece 3 is further provided with a limiting structure configured to limit displacement of the movable connecting plate 6 in a central direction of the arc-shaped groove 311. The limiting structure includes a baffle 33 arranged on the connecting piece 3. The arranged baffle 33 can also play a role of facilitating guiding the arc surface 611 of the matching portion of the support member 61 into the arc-shaped groove 311.

Working Principle

During installation of the movable connecting plate 6, the movable connecting plate 6 is inclined. Then the arc surface 611 of the matching portion is introduced into the arc-shaped groove 311 from the opening. Next, the movable connecting plate 6 is rotated by hand, and the movable connecting plate 6 is rotated away from the fixed connecting plate 5, so as to tension the soft top 4 until the end surface 612 of the matching portion is matched with the support surface 312 of the connecting piece 3, and then the locking device fixes the movable connecting plate. After assembly is completed, the movable connecting plate 6 is in a horizontal state (it can also be in a slightly inclined state, which can be set according to design requirements). When the convertible is needed, the locking device is first loosened. Then, the movable connecting plate 6 is rotated to an appropriate angle. The movable connecting plate 6 is pulled out of the arc-shaped groove 311, and the soft top 4 is rolled on the movable connecting plate 6 to an appropriate position (limited by bundling after rolling up), that is, the convertible is realized.

The above merely describes specific implementations of the present invention, but the protection scope of the present invention is not limited thereto. Those skilled in the art can easily conceive modifications or replacements according to the technical solutions and ideas of the present invention within the technical scope of the present invention, and these modifications or replacements shall fall within the protection scope of the present invention.

What is claimed is:

1. An overturning and tensioning mechanism for a convertible soft top of a vehicle, comprising:
    a vehicle body, wherein an upper end of the vehicle body is provided with a first opening,
    a soft top, wherein the soft top is configured to cover the first opening;
    a fixed connecting plate, wherein the fixed connecting plate is fixedly connected with the soft top, and the fixed connecting plate is fixed on the vehicle body;
    a connecting piece, wherein the connecting piece is fixed or integrally formed on the vehicle body, and the connecting piece is provided with an accommodating groove; and
    a movable connecting plate, wherein the movable connecting plate is fixedly connected with the soft top, the movable connecting plate is provided with a matching portion matched with the accommodating groove of the connecting piece, a second opening of the accommodating groove faces away from the fixed connecting plate, and the matching portion is configured for abutting against the accommodating groove and rotating relative to the accommodating groove, wherein
    the accommodating groove comprises an arc-shaped groove, a support surface extending from a first end of the arc-shaped groove is tangent to the arc-shaped groove and configured to support the matching portion, and the matching portion is provided with an arc surface matched with the arc-shaped groove and an end surface matched with the support surface.

2. The overturning and tensioning mechanism according to claim 1, wherein a support member is provided at two sides of the movable connecting plate, and the matching portion is provided on the support member.

3. The overturning and tensioning mechanism according to claim 1, wherein the movable connecting plate and the fixed connecting plate are respectively arranged on opposite sides of the soft top.

4. The overturning and tensioning mechanism according to claim 1, wherein a second end of the arc-shaped groove away from the support surface extends outward freely, and the second opening for guiding the matching portion is formed between the second end of the arc-shaped groove and the support surface.

5. The overturning and tensioning mechanism according to claim 1, wherein the arc-shaped groove is a semicircular groove.

6. The overturning and tensioning mechanism according to claim 1, wherein the connecting piece is further provided with a limiting structure configured to limit displacement of the movable connecting plate in a central direction of the arc-shaped groove.

7. The overturning and tensioning mechanism according to claim 6, wherein the limiting structure comprises a baffle arranged on the connecting piece.

* * * * *